United States Patent [19]

Thomas W. Gregory

[11] Patent Number: 4,787,739

[45] Date of Patent: Nov. 29, 1988

[54] RANGE FINDER

[76] Inventor: Thomas W. Gregory, 1252 Sunflower, Glendora, Calif. 91740

[21] Appl. No.: 936,796

[22] Filed: Dec. 2, 1986

Related U.S. Application Data

[63] Continuation of Ser. No. 595,414, Mar. 30, 1984, abandoned.

[51] Int. Cl.[4] .................... G01C 3/08; F41G 1/38; G02B 27/32; G01B 11/00
[52] U.S. Cl. .................................. 356/4; 33/246; 350/566; 356/21; 356/390; 356/391; 356/394
[58] Field of Search .................... 356/4, 21, 394, 391, 356/390, 397, 252; 33/245, 246, 241, 253; 42/1 ST; 350/566; 89/41.03

[56] References Cited

U.S. PATENT DOCUMENTS

| | | | |
|---|---|---|---|
| 1,190,121 | 7/1916 | Critchett | 33/245 |
| 2,437,363 | 3/1948 | Smith | 33/253 |
| 3,121,163 | 2/1964 | Rickert | 33/241 |
| 3,320,671 | 5/1967 | Rickert et al. | 33/241 |
| 3,392,450 | 7/1968 | Herter et al. | 33/245 |
| 3,814,521 | 6/1974 | Free | 356/391 |
| 3,885,861 | 5/1975 | Farnsworth et al. | 356/252 |
| 4,257,703 | 3/1981 | Goodrich et al. | 356/4 |
| 4,397,565 | 8/1983 | Ota | 368/242 |
| 4,403,421 | 9/1983 | Shepherd | 33/246 |
| 4,423,929 | 1/1984 | Gomi | 350/335 |
| 4,531,052 | 7/1985 | Moore | 89/41.03 |
| 4,584,776 | 4/1986 | Shepherd | 33/246 |

FOREIGN PATENT DOCUMENTS 2049634 4/1972 Fed. Rep. of Germany ........ 356/21

Primary Examiner—Stephen C. Buczinski
Assistant Examiner—Linda J. Wallace
Attorney, Agent, or Firm—Dennis H. Lambert

[57] ABSTRACT

A range finder for optically or electronically measuring distance from an object by comparison of a known curvilinear form or spectrum of points with the object being measured. The range finder, whether optical or electronic, is provided with different size outlines or stored images of the object, the different sizes representing the object as it would appear at different distances from the viewer. In its optical form, a number of different size outlines are provided on a transparency through which the object itself is viewed. The outline of the object as actually viewed is compared or matched with the known outline and the distance to the object is determined by relating the size of the actual outline to the closest size outline. In the electronic form, the comparison is made electronically rather than optically or visually. In both forms, only a portion of the object being measured need be visible for making the comparison.

16 Claims, 5 Drawing Sheets

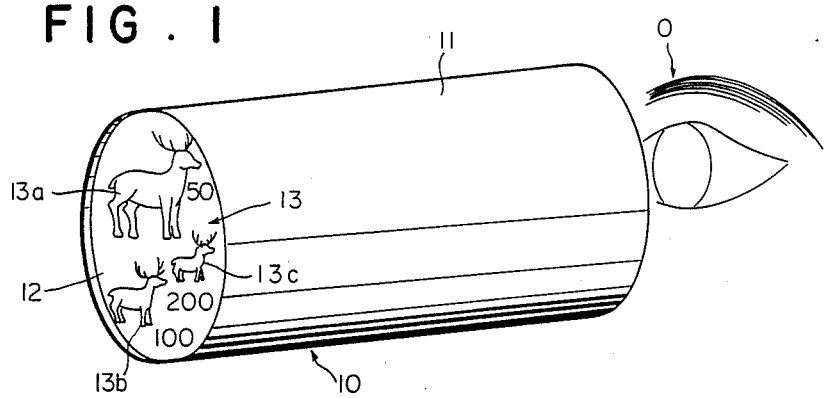
FIG. 1
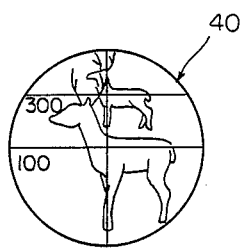
FIG. 9
FIG. 2
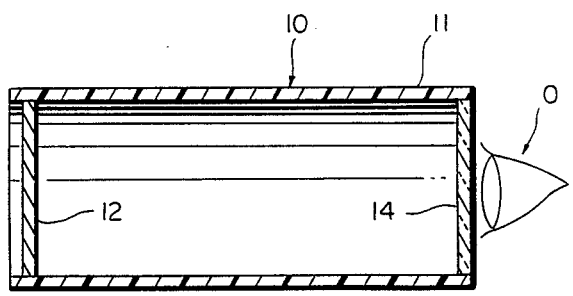
FIG. 3
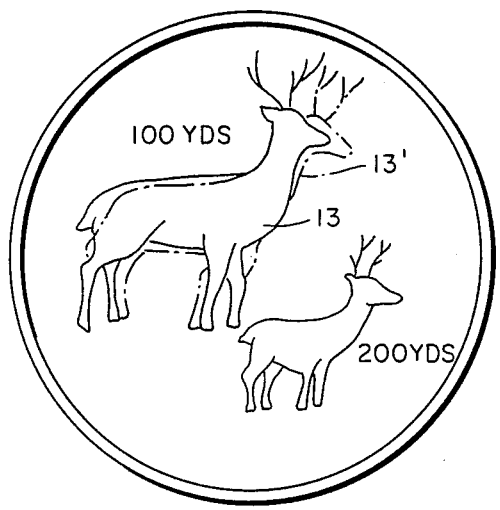
FIG. 4
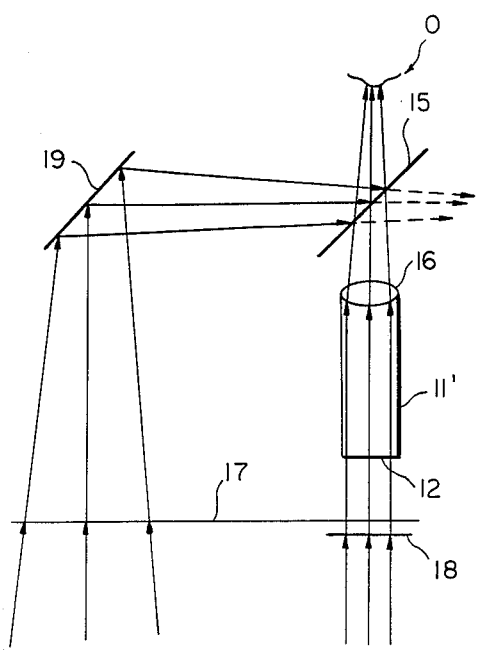

FIG. 10
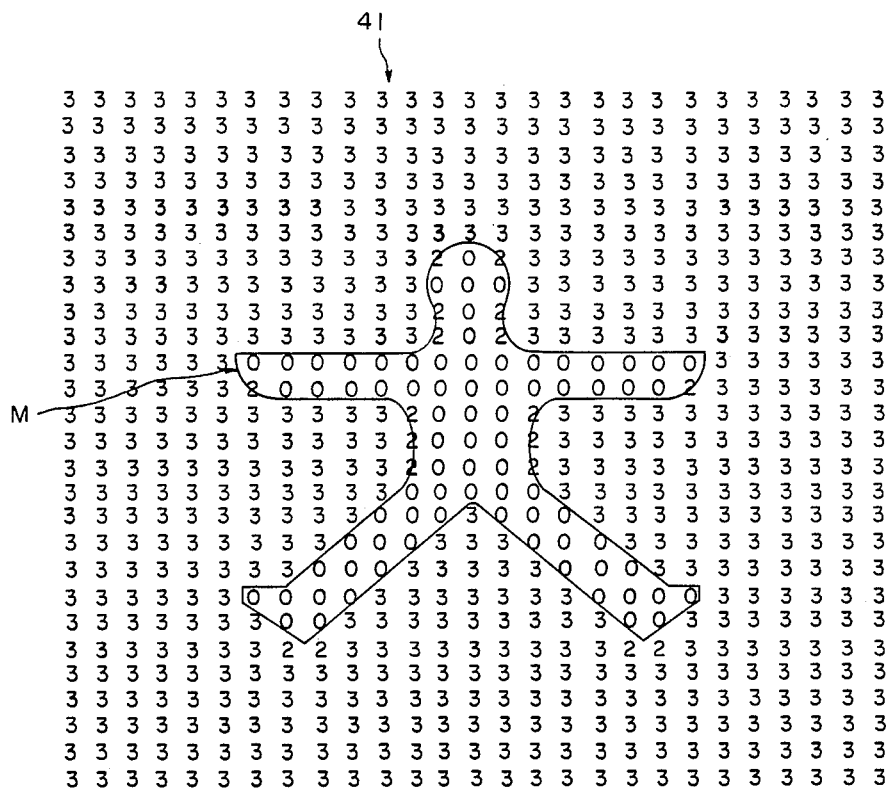
FIG. 11
```
3 3 3 3 3 3 3 3 3
3 3 3 3 3 3 3 3 3
3 3 3 3 0 3 3 3 3
3 3 0 0 0 0 0 3 3
3 3 3 3 0 3 3 3 3
3 3 3 0 3 0 3 3 3
3 3 0 3 3 3 0 3 3
3 3 3 3 3 3 3 3 3
3 3 3 3 3 3 3 3 3
```
0 = BLACK
1 = GRAY
2 = LIGHTER GRAY
3 = WHITE
FIG. 12

FIG. 13
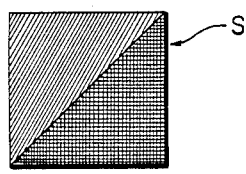
FIG. 14
```
3 3 3 3 3 3 3 3 3
3 3 3 3 3 3 3 3 3
3 3 2 2 2 2 1 3 3
3 3 2 2 2 1 0 3 3
3 3 2 2 1 0 0 3 3
3 3 2 1 0 0 0 3 3
3 3 2 1 0 0 0 3 3
3 3 1 0 0 0 0 3 3
3 3 3 3 3 3 3 3 3
3 3 3 3 3 3 3 3 3
```
43
0 = BLACK
1 = GRAY
2 = LIGHTER GRAY
3 = WHITE
FIG. 15
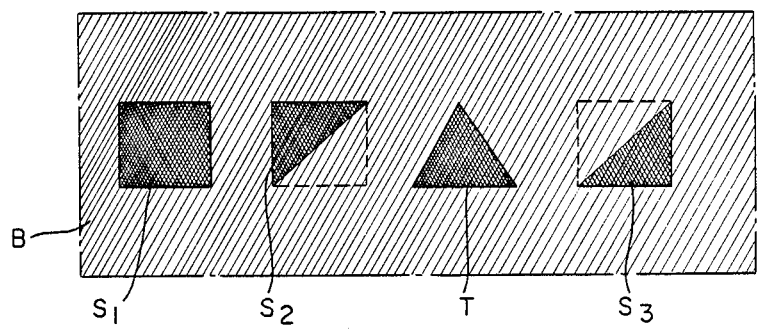
FIG. 18
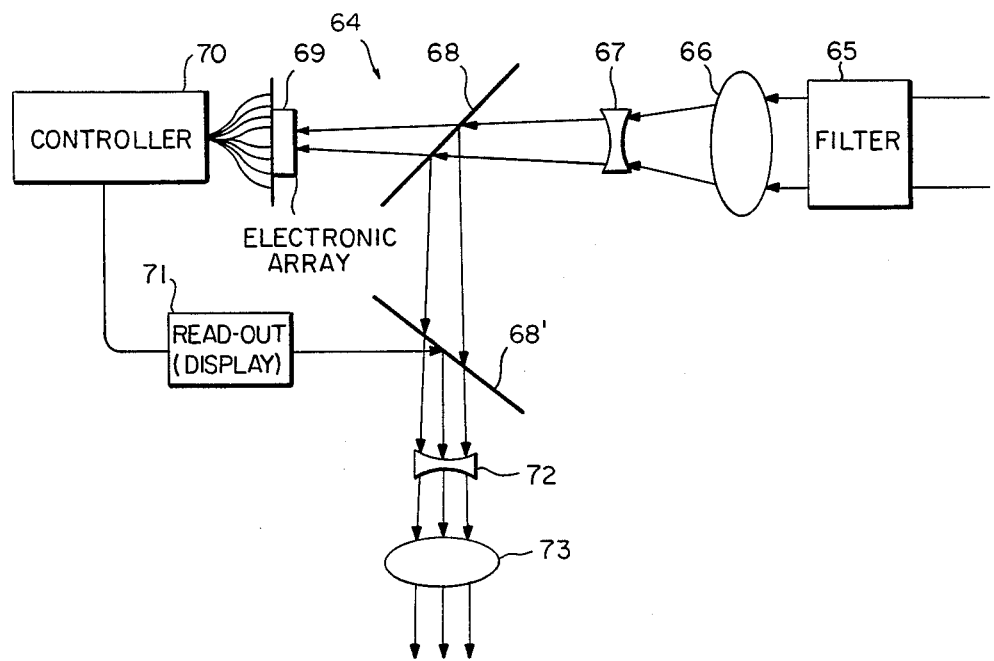

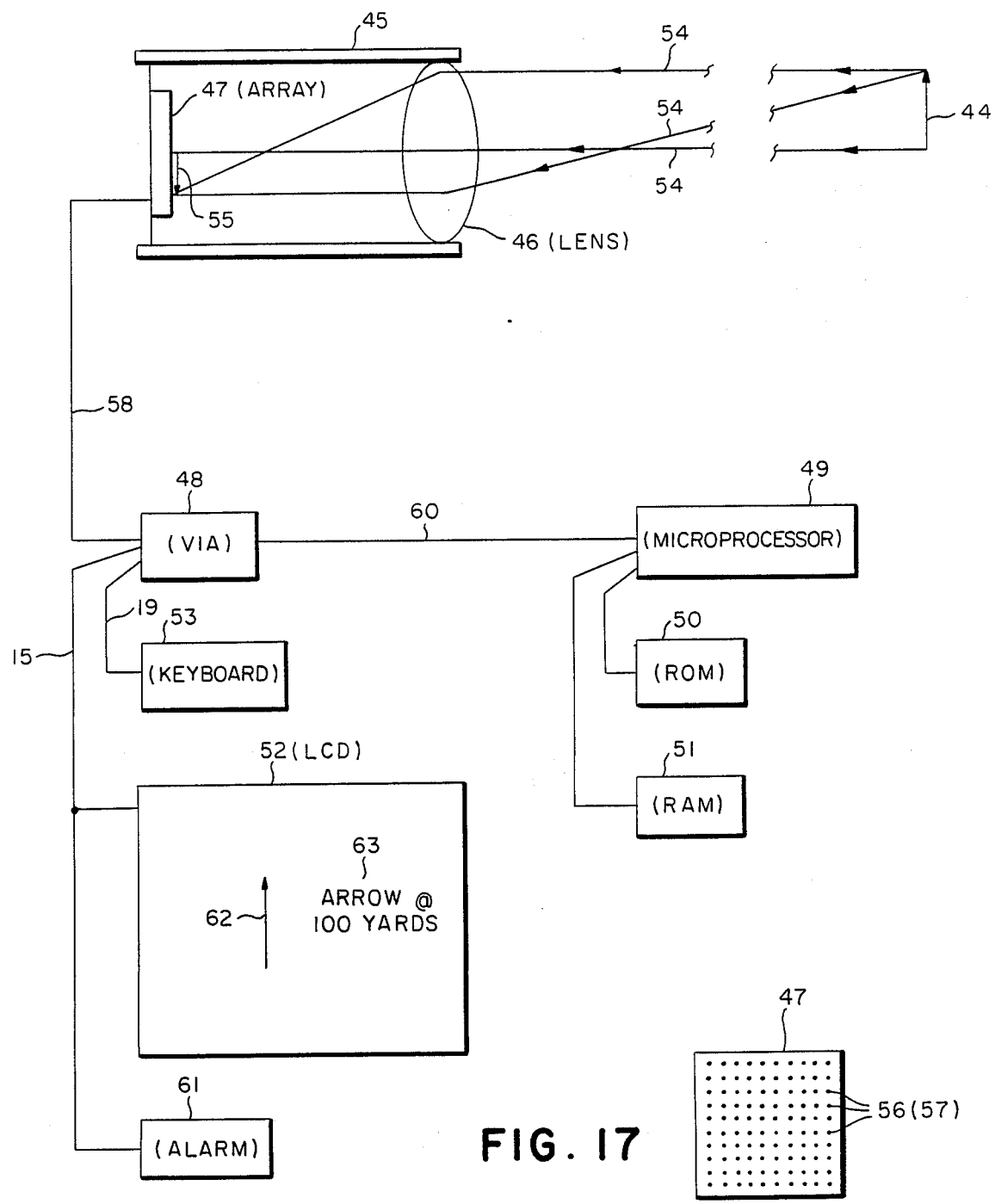

RANGE FINDER

This is a continuation of application Ser. No. 595,414, filed Mar. 30, 1984, now abandoned.

BACKGROUND OF THE INVENTION

1. Field of the Invention

This invention relates to devices for determining distances to objects. More particularly, the invention relates to a range finder which measures distance by comparing a known curvilinear form or spectrum of points with the object being measured.

2. Prior Art

Various devices are known in the prior art for determining distances to objects, including devices which rely on stadia principles. In these devices, a series of marks representing different distances are compared against an image of the object being viewed and the distance of the object from the viewer can thus be determined. However, specific major portions of the object must be visible in their entirety in order to obtain a measurement.

Examples of some such prior art devices are disclosed in the following U.S. Pat. Nos.: 3,749,494, 3,859,732, 3,977,086, 4,016,654, 4,263,719 and 4,367,949. None of these patents disclose a device in which several different size out-lines or spectrum of points of an object are provided, against which the actual object being viewed is compared to determine the distance of the object from the viewer, and particularly where only a portion of the object being viewed need be visible in order to make an accurate measurement.

Other prior art devices rely upon electronic image sensing. In these devices, an object to be sensed electronically is generally focused by a lens onto a photodiode array where the image is effectively changed from light energy to electrical energy. A photodiode array generally has two unique information sets for each diode. The first information set determines the location of the diode. The second information set determines the intensity of the reflected light from the object.

The information of the first set is presented in a distinct manner representing a position immediately before and immediately after the subsequent and preceeding locations, respectively. This information might typically be designated as location X,Y. For example, if a point is referred to as location 100,11, this point will be located physically on an array containing 10,000 points at a position at the extreme right hand side of the array and 11 rows down from the top. In other words, digitized information is available which can be processed in a computer.

The information of the second set is presented in an analog manner and indicates the light intensity. This light intensity can be seen on an oscilloscope as $y=mx$, where black $\leq y \leq$ white and m is the slope of the line. In other words, a straight line or linear relationship exists between the diode signal x and the corresponding contrast y.

PURPOSE OF THE INVENTION

The primary object of this invention is, therefore, to provide a range finder which is simple and economical to make and use, and which enables accurate determination of distance to an object even when only a portion of the object is visible to the observer.

Another object of the invention is to provide a range finder which compares the outline of an observed object with a plurality of different size curvilinear outlines of the object, each size representing the object as it would appear at a different distance from the observer, thus enabling determination of the distance of the object from the observer.

A further object of the invention is to provide a range finder having a transparency with a plurality of different size curvilinear outlines of an object thereon or capable of being seen thereon, each outline representing a different distance of the object from the observer, whereby an observer may view the actual object through the transparency of film and compare the outline of the actual object with the outlines on the transparency to determine the distance of the object from the observer and compensate for projectile trajectory.

Yet another object of the invention is to provide a range finder which electronically recognizes an image of an observed object and compares its outline, orientation and contrast with stored or generated images of that same object and calculates the distance to the observed object based on the comparison.

SUMMARY OF THE INVENTION

These and other objects and advantages of the invention are accomplished by the range finder as described herein. The range finder, in a first form, is an optical device having a tubular construction with a plurality of different size outlines on or capable of being put on a transparency through which an object is viewed. The outline or size of the viewed object is compared or matched with one of the outlines on the transparency to determine the distance of the object from the observer. The curvilinear outlines of the object enable an accurate comparison of the viewed object with several comparison points, so that an accurate determination of the distance of the viewed object from the observer can be made even if only a portion of the viewed object is visible to the observer.

The outlines on the transparency are precisely scaled to an average object (such as a deer, man, etc.) as seen at a known distance, and that distance is indicated next to the appropriate outline. The arrangement of the outline for each object is predetermined for easiest use of the device. For instance, for viewing some objects, a front elevation may be best suited for the outline, while for other objects a side elevation may be best. Since the curvilinear outline of the object provides several major comparison points, the object being viewed need not be oriented in the same way as the outline in the range finder, nor need the entire object even be visible. Some part of the object is selected and compared with a corresponding part of the outline on film. Thus, if the object being viewed is a man, and the outlines on the film show a man in a standing position, the man being viewed could be sitting down and the distance to him still determined by simply comparing the head and shoulders of the man being viewed with the head and shoulders of the outlines on the film.

By vertically offsetting the outlines, projectile trajectory can also be compensated for.

Another form of the invention is electro-optical and makes the comparison between the viewed object and stored or self generated images or outlines of the object via electronic means. In this form of the invention, electronic images or curvilinear outlines or a spectrum of points are stored or generated in the memory of a data processor. An array or matrix of light sensitive means, such as photodiodes, are arranged to have light reflected from the object strike them, producing an output which is fed into the processor. The intensity of the reflected light causes the specific diode which it strikes to transmit a signal which is equivalent thereto, e.g. from black to white. The reflected light is projected onto the array by lens means; and, by suitable selection of a filter through which the reflected light passes before striking the array, the range finder can be made sensitive to selected areas of the light spectrum. For example, the range finder can be made sensitive to the infrared spectrum. The processor then electronically recognizes and compares the image as "seen" by the array and the stored or generated images, calculates the distance to the viewed object based on such comparison and gives an indication of the distance. Estimation of the distance is thus eliminated.

A third form of the invention is also electro-optical, but unlike the first two forms, all functions are performed electronically and without the requirement of human assistance. In this third form, and to a limited extent, in the second form, image sensing and pattern recognition are used with a processor or computer to achieve the distance measurement.

For use in the computer, the analog output of the diode is converted to a digitized input to the computer. A computer program can be written to accomplish this, but it is more expedient, in general, to use hardware. Analog to digital converters for this purpose are readily commercially available. Such converters are not significantly different from those used to manipulate the information from a paddle in a computer game.

From the information sets obtained from the diode array, a two dimensional array is set up which completes the transfer of information from the object and camera to the computer (data processor). The information is then in a form which the computer can readily use through appropriate programs.

The data base for the programs preferably consists of outlines which represent the object as seen from various distances. In practice, there may be only one outline which is reduced or enlarged in the computer through a subprogram. The amount of reduction or enlargement establishes the distance to the object. The data base could, for example, be generated through a single object at a known distance which is imputed through the camera.

For the present invention, as applied with a computer or microprocessor making the comparison, several things are necessary. First, the computer must have a standard against which to compare the object for which the distance is being measured. Second, the object must be perceived by the computer. This is accomplished by essentially the same process by which the standard is put into the computer in the first place. Third, the object must be recognized by the computer so that the comparison can be made. For instance, if the camera (range finder) were aimed manually, or if the computer were to aim and search for the object, the computer would have to recognize where the object is (as would be seen on the computer's monitor) and to distinguish the desired object from others in the background. This process of finding the correct object is generally referred to in the computer science field as pattern recognition. Once the pattern is recognized by currently available techniques, the parameters required for the present invention are available from the same technique.

If the standard is properly established, three dimensional information can be available for comparison to the desired object. In other words, the standard can be rotated about an axis and any of the various orientations utilized to recognize the desired object and make the comparison required to determine distance to the object. If this process were observed on a monitor, and if the standard was an image of a deer, for example, the camera (range finder) would scan an area of terrain (wooded field, for example) and the viewer would observe the scene. If a deer were present in the field, it would likely be partially camouflaged by its surroundings. As the area is being scanned, an image of the standard (deer) would periodically appear in the center of the screen for each time the computer determines there is a possibility of an actual deer being present. The standard would grow larger or smaller as it was rotated, while the computer attempted to confirm the recognition. If the computer determines that there is not sufficient information to make the recognition, it will continue to scan until another possibility is discovered. If the computer recognizes a real deer, the deer's image will be illuminated to better distinguish it from its background of trees and superimposed to show the percentage of recognition. The distance to the deer will be displayed adjacent to the image.

In all three forms of the invention, depth perception is the main purpose of the range finder. All three forms have many uses, with the electronic form being more versatile because of the electronic comparison made in the processor. For example, the invention would enable depth perception to be attained with only a single viewing lens or "camera", thus making the invention suitable in the field of robotics.

The inspection of precision parts can be accomplished with the invention without the necessity of first having to establish a precise, fixed distance between the object and the range finder.

The invention also is particularly suitable for control systems. Such systems have been hampered in their flexibility because they are limited by the number of unique inputs defining their function. With the invention, the number of unique inputs is multiplied by many orders of magnitude, and each object or portion of the object can be used as an input once the standard is established.

In the field of surveying, use of the electronic comparison with higher and variable magnification in conjunction with electronic arrays can result in a system which is competitive with existing electronic distance measuring equipment. Further, the ability to see the object through the same device making the measurement is a feature the existing devices do not have.

The invention can also be useful in the fields of computer aided design/drafting, automatic surveillance and data acquisition/interpretation.

BRIEF DESCRIPTION OF THE DRAWINGS

Further advantages of the invention will appear in the following description and appended claims, reference being made to the accompanying drawings forming a part of the specification, wherein like reference characters designate like parts throughout the several views, and wherein:

FIG. 1 is a front perspective view of a first form of the invention, wherein the distance determination is made optically by the user of the invention;

FIG. 2 is a longitudinal sectional view of the device shown in FIG. 1;

FIG. 3 is a somewhat schematic view of the device in FIG. 1, showing the images seen by the user of the invention, with a deer at about 100 yards matched with the image on the transparency for that range;

FIG. 4 is a schematic view of a variation of the first form, showing the invention used with a beam splitter;

FIG. 9 is a schematic view showing the invention used with a cross hair for compensating for trajectory;

FIGS. 10 through 15 are representations of digital processing of images, depicting the manner in which digital information may be used in comparison;

FIG. 16 is a schematic view of a third form of the invention, wherein an automatic surveillance is provided without the observer making the comparison;

FIG. 17 is a schematic frontal view of the array in FIG. 16, showing the light sensing elements; and FIG. 18 is a schematic view of a variation of the third form of the invention, wherein the comparison between the observed object and stored or self-generated image is made electronically.

DESCRIPTION OF THE PREFERRED EMBODIMENTS

Figure 5:
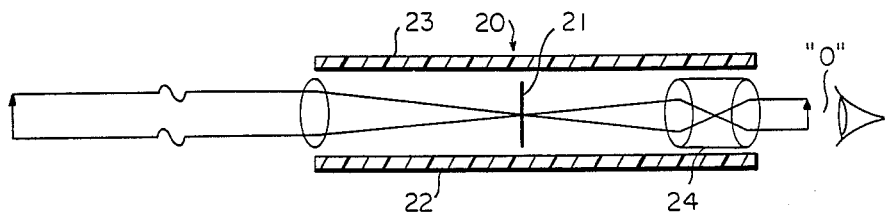
FIG. 5 is a longitudinal sectional view of an image erecting riflescope.

Referring more specifically to the drawings, a first form of the invention is shown at 10 in FIGS. 1 and 2, and comprises a tube 11 of any suitable material, such as plastic or metal or the like, having a transparent film 12 in one end with outlines 13 of some predetermined object thereon and a glass or lens or the like 14 at the other end.

The outlines 13 are provided in a number of different sizes 13a, 13b and 13c, each size representing the object as it would appear at the indicated distance from the observer. In the example shown, the outline is of a deer, with the outlines 13a, 13b and 13c representing distances of 50 yards, 100 yards and 200 yards, respectively.

In use, the observer O would look through the tube 11 at the object and, as represented in FIG. 3, would match the outline 13' of the observed object with the nearest size outline on the film 12. In the example shown in FIG. 3, the observed object approximately matches the outline of that object as it would appear at 100 yards. Thus, the observer is able to determine that the object is approximately 100 yards away. If the observed object had an observed size falling approximately midway between the size of the two outlines on the film, the observer could estimate that the object was about 150 yards away.

It is important to note that not all of the observed object needs to be visible to the observer in order to use the invention to calculate the distance to the object. For instance, it would be sufficient to match the head and shoulders of the observed object with the image on the film. Of course, other portions of the object could be matched in order to determine the distance to the object.

The concept of the invention is utilized with a beam splitter 15 in FIG. 4. In this form of the invention, a tube 11' has a film 12 at one end with the appropriate curvilinear images (not shown) thereon, and a magnifying glass or lens 16 at the other end. The distance between the film and lens determines the extent of magnification. A sheet of clear glass or other suitable transparent material 17 is placed in front of the tube 11', and a translucent film 18 is placed in front of the sheet 17 to diffuse light. The beam splitter 15, behind the tube, receives light from both the tube and a mirror 19 spaced behind the sheet 17 and to one side of the tube. The outline of an observed object is then matched up with an appropriate outline on the film, as before.

A conventional telescope 20 is seen in FIG. 5, wherein a reticle 21 is supported in tube 22. Light passes through objective lens 23, reticle 21 and eyepiece 24 to the eye of the observer. The focal point of the light is placed on the reticle 21, which is provided with opaque markings such as a cross-hair. These markings are seen by the observer as superimposed on the object "O" after light passes through the eyepiece 24.

Figure 6:
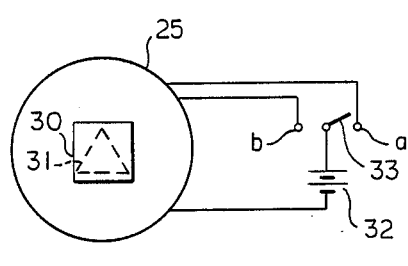
FIG. 6 is a schematic view of a second form of the invention wherein an electro-optical device is shown with a liquid crystal display (LCD) reticle and its simple switching circuit, and wherein the distance determination is made by the user of the invention.
Figure 7:
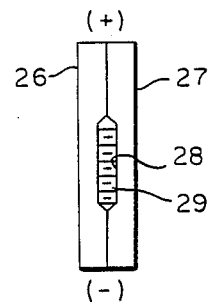
FIG. 7 is a schematic cross-sectional view of the LCD reticle shown in FIG. 6.

In the present invention, a liquid crystal display (LCD) 25, FIG. 6, would be used in the telescope 20 in lieu of the conventional reticle 21. As seen in the cross-sectional view of the LCD in FIG. 7, the LCD is commonly made from two pieces of glass 26 and 27 fixed together and having a cavity 28 etched in their facing surfaces. The cavity is filled with a liquid 29 which will, when exposed to an electrical current, turn opaque. Common examples of the use of LCD's are the displays used for many calculators and watches. Although not yet in everyday use, LCD's are also used in miniature television sets.

The LCD 25 in FIG. 6, for the purpose of the invention, is shown with two unique outlines 30 and 31 which are used to determine the distance of a like object seen through a telescope in which the reticle (LCD) is mounted. For the square outline 30 to be opaque, an electric current, as provided by the battery 32, must be present. This is accomplished by putting the switch 33 in position "a". If the switch 33 were in position "b", the triangular outline 31 would be opaque. Because the switch 33 is in position "a", the square outline 30 is opaque and the triangular outline 31 is transparent.

Returning to FIG. 5, conventional opaque markings such as a cross hair are replaced or augmented by the LCD reticle 25. In this manner, the invention provides for a plurality of outlines by the mere flicking of a switch 33. For example, if a hunter is seeking deer as his game, he would set the switch 33 for deer outlines and be able to determine the distance to his game. If, on another day, the hunter is hunting bear, he would set the switch 33 for bear on the same device and be able to determine the distance to that specific animal.

Figure 8:
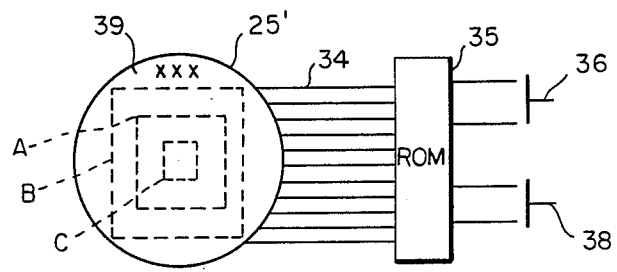
FIG. 8 is a schematic view showing a LCD reticle with its switching circuit.

In another embodiment of the invention, the LCD 25' in FIG. 8 enables the hunter a more precise measurement to his game. The LCD 25' is coupled by a plurality of circuits 34 to a microprocessor 35. By means of a momentary contact switch 36, any of the various outlines of game, i.e. deer, bear, pronghorn, etc., can be displayed. These outlines are stored in the microprocessor ROM 35 in much the same manner as time and calendar functions are stored in the microprocessor of a LCD watch.

Upon initiation of a particular outline, such as the square 30, that outline would be displayed on the LCD 25'. The hunter would then aim the device (telescope 20 with LCD 25' in place of reticle 21) at the actual object and depress the momentary contact switch 38. This switch 38 would cause the microprocessor 35 to energize various circuits of 34, in turn causing the LCD 25' to display first 30A, then 30B, 30C, etc. When the hunter is able to match the appropriate size outline with the object, he would then read the distance to that object on display 39. Releasing the momentary contact switch 38 would leave only the outline displayed on the LCD. The hunter would, in effect, see the outline of his choice either shrinking or growing in the LCD 25'. When the proper size is obtained, the distance would be determined as described in connection with previous examples of the invention.

In FIG. 9, the outlines are shown offset from concentricity in conjunction with a cross hair system 40, whereby the viewed outline enables a compensation to be made for trajectory based on the observed distance.

FIG. 10 depicts a digitized array 41 of the silhouette of a man M doing jumping jacks. For convenience and ease of understanding, the outline of the man has been sketched in the proximity of the numbers which actually define the silhouette.

FIG. 11 depicts a digitized array 42 from an electronic camera, i.e. a lens/photodiode combination, not shown, and FIG. 12 shows the object M whose reflected light resulted in the image projected onto the photodiodes of the camera (not shown), and finally, in the digitized image in the array 42 in FIG. 11. The digitized information of FIG. 11 is compared with that in the data base 41, FIG. 10, to determine the appropriate data base size which matches. Once a match is obtained, the distance to the object will be known. It will be noted that FIG. 10 comprises a 27×27 array while the object in FIG. 11 is a 9×9 array. Therefore, the appropriate data base size would be one that is one third smaller than FIG. 10. This means that the object M, FIG. 12, depicted in the array of FIG. 11 is three times as far away as the one depicted in the data base. For example, if the data base of FIG. 10 represents an object 1,000 feet away, the object in FIGS. 11 and 12 would be 3,000 feet away.

A program makes this comparison. Considerations include that the data base may have been cleaned up such that only an outline of the object exists and a contrasting solid background. The information from the camera, on the other hand, is not cleaned up and has whatever background which is present at the time of image sensing. Further, the camera need not be positioned as the data base is. To compensate, the program translates or moves the object or data base information up, down, right, and left. It also rotates the information. Therefore, the program is required, for maximum effectiveness, to reduce or enlarge, compare contrast, translate, and rotate the data base with respect to the object.

Let it be assumed for this example that it is desired to determine the distance to an object which resembles a square S, FIG. 13. The data base square has two legs which are horizontal and two that are vertical. It furthermore is seen on a white background and has, from a point in the upper right hand corner to a point in the lower left hand corner, a division of gray and black, with the black half being in the lower right hand interior. Let it further be assumed that the digit 0 has been assigned to be black, 3 to white and shades of gray are increasingly lighter on a linear basis from 0 to 3. The gray of the data base is 2.

FIG. 14 shows an array 43 which has digitized this information. Note that the diagonal line separating the black and gray is depicted as the shade of gray, 1, which is half way between 0 and 2, representing black and gray, respectively.

There are several images in FIG. 15 which are seen through the camera and computer. The distance to the appropriate image must be determined and the rest ignored. For this example, it is assumed that the bottom of the several images are horizontal. These images are an equilateral triangle T and three squares $S_1$, $S_2$ and $S_3$. One square, $S_1$, is black and the other two squares $S_2$ and $S_3$ are black and gray, with one of these, $S_3$, being the object desired, while the other, $S_2$, is the opposite in that the black portion is in the upper left rather than the lower right hand interior of the square. To complicate matters, the background B is a number 2 shade of gray. The two black and gray squares $S_2$ and $S_3$ can therefore be seen only as 45° black triangles (the dashed line is shown only for ease of understanding).

The program makes a comparison between its data base and the object and its background to determine the similarities. Obviously, no precise match can be made. However, the images B, $S_1$ and T can be excluded because there is no possible way in which they could match the data base. Images $S_2$ and $S_3$ could be partially matched. Image $S_2$ requires the program to do reduction, contrast comparison, translation and rotation. Image $S_3$ requires the same with the exception of rotation. Therefore, image $S_3$ is the best fit.

The program is, therefore, required to accomodate "best fit" criteria to indicate distance in this case. An indication in the computer output notifies the observer that a match has been made on a best fit basis and to what extent this best fit was made. In this example, the best fit ($S_3$) would be 50% and no rotation was required. The program can be enhanced by having the computer give information that another best fit was obtained, i.e. $S_2$, but that 180° rotation was required. A distance determined by the size reduction of the data base to match the object would also be noted.

For clarity, a simple example has been shown and described. However, the extension to more complex applications which embody both the object's outline or the object's spectrum of points or a portion of either can be duplicated by a person skilled in the art. This outline or spectrum of points does not have to be a square or other simple geometrical figure. It does not have to be a closed or continuous outline or area. A comparison between a known and an unknown must be made in order that the unknown can be recognized and further that the distance to the unknown can be determined.

A further embodiment of the invention is shown in FIG. 16, which depicts one of many possible arrangements and sets of components which would accomplish the purpose of distance determination as contemplated by the invention. In this embodiment, it is desired to obtain the distance to an unknown object 44 (except that it is known to be one of a number stored in memory). The device 45 is aimed at an area where the background (not shown) is known and light 54 reflected from the object 44 and its background (not shown) is focused by lens 46 on the photodiode array 47. The lens 46 forms an image 55 and it is this image 55 of the object 44 (in addition to the background, not shown) that the array 47 perceives.

The array 47 is shown in more detail in FIG. 17. Here, the array 47 is composed of numerous pixels 56. Each pixel 56 is a photodiode 57 and is capable of perceiving the reflected light 54 of FIG. 16 from the object 44 according to the intensity of the reflected light. The intensity of reflected light is read through connection 58 by the input/output device (I/O), the variable interface adapter (VIA) 48 and transferred through connection 60 to the microprocessor 49. The microprocessor contains a clock (not shown) which sends a signal to the VIA 48. The VIA 48 is analogous to an amplifier and augments the drive (not shown) of the control function of the microprocessor 49 in controlling the information received from the array 47. Each pixel 56 is successively relieved of its information of the intensity of reflected light from the object 44. This information will, as will be described below, be temporarily stored in RAM 51.

The ROM 50 contains previously stored information. This information includes the program which recognizes the object 44, compensates for the background (not shown), stores known objects by their curvilinear form or spectrum of points for comparison, and compares the object 44 with the known object to determine the distance.

The RAM 51 temporarily stores any information received from the array 47 or required by the program in ROM 50.

The image 55 of the object 44 is now residing in RAM 51. The program in ROM 50 will now cause the system to go through the process of recognizing the object 44, compensating for the background, and once having recognized the object 44, compare it to the size of the known standard image, also previously stored in ROM 50, to determine the distance.

All of the above which could result in an image can be seen by the observer((not shown) on the LCD 52. If the observer is not actually looking at the LCD 52, an alarm 61 will give an audible signal in any event, once a recognition is made. The object 44 is seen by the observer on the LCD 52 as the image 62. A description of the object and its distance would also be displayed on the LCD 52 at 63. When the observer reviews the display on LCD 52, he may then take appropriate action (unless that action was previously determined by the program in ROM 50). He would take this action by either going himself (or by sending someone) or by accessing the system through the selector 53. The selector 53 could be a simple on/off switch or a keyboard which enables the observer to access a predetermined program of options or instructions in ROM 50 in order to further assess the situation or to review the policy for which further actions should follow. This embodiment of the invention is particularly suited to the surveillance of an area where the need is to determine the change that has occurred. This change could be the intrusion of a foreign body such as a man in the area of surveillance or the change of the background proper.

All of the components of this embodiment are readily commercially available. For example, the lens 46 can be obtained from Melles Griot; the photodiode array 47 may comprise an EG & G Reticon RA 100×100; the versatile interface adapter 48 may be Rockwell International's R6522; the microprocessor 49 may be Rockwell's R6502; the ROM (read only memory) 50 may be Rockwell's R2332; the LCD (liquid crystal display) 52 may be Crystalvision's CVA 640/250; the selector 53 can be any of the many switches offered by Grayhill, Inc.; and the RAM (random access memory) 51 may be Rockwell's R2114. There are a myriad of other suppliers to OEM's which offer similar components, and variations may be desirable to the number of components listed above.

Another form of the invention is indicated generally at 64 in FIG. 18, wherein reflected light from the object (not shown) passes through an appropriate filter 65 and lenses 66 and 67 to a beam splitter 68. Light passed through the beam splitter impinges upon an electronic array 69, which may comprise a matrix of photodiodes (not shown). A commercially available diode array has a spacing between each diode of about 0.59 mils. The diodes are, in turn, connected with a data processor and controller 70, which has some predetermined number of images or outlines stored in its memory. The diodes transmit a signal which corresponds to the intensity of the reflected light striking that diode, and the processor electronically compares the resultant image with one of the stored images, producing a signal in response thereto and causing that signal to be displayed on readout 71, which is observed through lenses 72 and 73 and beam splitter 68'.

Other types of light sensitive means may be used in the electronic array, and the filter 65 can be selected to render the invention sensitive to a selected part of the light spectrum. For example, the filter could be appropriately selected to make the invention sensitive to the infrared spectrum for detecting body heat and determining distance even in darkness. Moreover, either an optical or electronic sighting system may be used, and the signal from the data processor and controller can be used to perform any suitable desired function.

By image processing techniques, any standard outlines, such as shown in FIGS. 1 and 3 can be programmed in the data processor memory and comparisons made with the electronically formed digitized images. The array can be a linear or one dimensional arrangement rather than a two dimensional field, and the equivalent two dimensional form of the object obtained by moving the array or the object at a known or given rate or unit of movement.

For instance, the reticle 21 in FIG. 5 (prior art) generally consists of a wire cross hair or a punching of thin metal resulting in the same configuration. Clearly, the use of a wire figure in the shape of the desired object and used as a single image reticle in a variable power riflescope whereby the change in magnification results in a change in the relative size of image and object is within the scope and spirit of the invention.

Likewise, the use of principles of the invention when used to enhance the capabilities of other systems is within the scope and spirit of the invention and is contemplated. For example, radar is a useful means of determining the location and distance of an object. Using the principles of the invention, after having correlated radio waves into some facsimile of an image, confirmation of object identification, orientation and distance will be apparent.

Similarly, while trajectory compensation has been described, compensation for lead is obvious once the concept of the invention is understood, and is therefore contemplated. Lead is generally described as the aiming ahead of a moving object such that factors such as the speed, direction, etc., of the projectile are compensated for such that the path of the object and projectile will intersect at the same time.

Further, while use of the invention as previously described can be thought of as implying real time measurement, historic time, etc., is also contemplated.

While the invention has been shown and described in detail, it is obvious that the invention is not to be considered as being limited to the exact form disclosed, and that changes in detail and construction may be made therein within the scope of the invention, without departing from the spirit thereof.

Having thus set forth and described the invention, what is claimed is:

1. A range finder for determining distances to objects, comprising:
   a housing through which an object is viewed;
   means associated with the housing for storing multiple images of said object, said multiple images being substantially identical in shape or configuration to the actual shape of the object and having different sizes representative of the object at different distances from the observer;
   means for comparing all or part of the viewed object with all or part of the stored images and correlating the viewed object with the images to determine the distance of the object from the observer based on the correlation, said means including a photodiode array in said housing, upon which light rays reflected from the object impinge to energize one or more of the photodiodes and produce an electrical impulse representative of the shape and size of the viewed object, said photodiode array being arranged to perceive the intensity of light reflected from the object;
   means connected to receive the electrical impulse to provide a comparison between the viewed object and the stored image, including a microprocessor connected to receive signals from the photodiode indicative of the reflected light from the object;
   a memory means connected to receive information from the microprocessor based on the signals from the photodiodes, said memory means having stored images of the object therein, and being operative to compare the stored images with the information received from the microprocessor and compute the distance to the object; and
   a liquid crystal display connected to receive data from the memory resulting from the comparison made in the memory means and to display an image of the object along with a display of the distance to the object.

2. A range finder for determining distances to objects, comprising:
   a housing through which an object is viewed;
   means associated with the housing for storing multiple images of said object, said multiple images having different sizes representative of the object at different distances from the observer; and
   means for comparing all or part of the viewed object with all or part of the stored images and correlating the viewed object with the images to determine the distance of the object from the observer based on the correlation, said means including means for electronically varying the size and orientation of the image, resulting in a moving image which facilitates the ability to rapidly and accurately compare the image with the object.

3. A range finder as claimed in claim 2, wherein:
   the images are formed on a transparent plate in the housing, through which the object is viewed.

4. A range finder as claimed in claim 3, wherein
   a translucent film is positioned in front of the plate carrying the images for passing light to the eye of the observer but filtering out light reflected from the object;
   a beam splitter is positioned to receive light rays passing through the translucent film; and
   a mirror is positioned to receive light rays reflected from the object and to reflect the light rays onto the beam splitter, whereby the observer is able to match the outline of the viewed object with the outline of the images on the plate.

5. A range finder as claimed in claim 2, wherein:
   the stored images are displayed on a liquid crystal display.

6. A range finder as claimed in claim 5, wherein:
   the stored images are stored in an electronic memory; and
   switch means are connected between the memory and liquid crystal display for selectively displaying different images.

7. A range finder as claimed in claim 6, wherein:
   images of different objects are stored in the memory, whereby operation of the switch means results in display of images of different objects.

8. A range finder as claimed in claim 2, wherein:
   a photodiode array is carried in the housing, upon which light rays reflected from the object impinge to energize one or more of the photodiodes and produce an electical impulse representative of the shape and size of the viewed object; and
   means is connected to receive the electrical impulse to provide a comparison between the viewed object and stored image.

9. A range finder as claimed in claim 8, wherein:
   the photodiode array is arranged to perceive the intensity of light reflected from the object;
   a microprocessor is connected to receive signals from the photodiodes indicative of the reflected light from the object;
   a memory means is connected to receive information from the microprocessor based on the signals from the photodiodes, said memory means having stored images of the object therein, and being operative to compare the stored images with the information received from the microprocessor and compute the distance to the object; and
   a liquid crystal display is connected to receive data from the memory means resulting from the comparison made in the memory means and to display an image of the object along with a display of the distance to the object.

10. A range finder as claimed in claim 2, wherein:
    the stored images consist of a spectrum of points of the object, whereby all or a portion of said spectrum may be correlated with all or part of corresponding spectra between the object and stored images thereof.

11. A range finder as claimed in claim 3, wherein:
    the images are formed by opaque material.

12. A range finder as claimed in claim 11, wherein:
    magnification means is provided which, upon regulation, enables distance determination by comparison of the relative size between the object and the image.

13. A range finder as claimed in claim 2, wherein:
    the images are offset to enable compensation for trajectory and lead.

14. A range finder as claimed in claim 5, wherein: means is included for varying the size and orientation of the image, resulting in a moving image which facilitates the ability to rapidly and accurately compare the image with the object.

15. A range finder as claimed in claim 10, wherein: alarm means is provided to give a signal when a comparison is accomplished, thus facilitating a passive/active range finding system.

16. A range finder as claimed in claim 2, wherein: multiple images of different objects are stored in said range finder.

* * * * *